United States Patent Office 2,857,362
Patented Oct. 21, 1958

2,857,362

EPOXY RESIN

Ridgley G. Shepherd, Jr., Weston, and Elizabeth C. Dearborn, Boston, Mass., assignors to United States Testing Company, Inc., Hoboken, N. J., a corporation of New Jersey No Drawing. Application July 30, 1953
Serial No. 371,419

13 Claims. (Cl. 260—47)

This invention relates to resins. More particularly it is directed to epoxy resins manufactured from novel complex glycidyl ethers; and those ethers per se.

These novel epoxy resins are characterized by markedly improved resistance to heat distortion.

Epoxy resins have previously been made from glycidyl ethers of relatively simple hydroxyphenyl compounds by the curing thereof with cross-linking agents such as carboxylic acid anhydrides or amines. Although such heretofore known epoxy resins possess many valuable characteristics, they are lacking in adequate resistance to heat distortion.

We have discovered that markedly improved characteristics in epoxy resins may be achieved by employing, as the starting materials, novel complex glycidyl ethers, as for example the novel glycidyl ethers of 2,2,4,4-tetrakis (4'-hydroxyphenyl)pentane, and the homologous 2,2,5,5-tetrakis(4'-hydroxyphenyl)hexane, to wit, the 2,2,4,4-tetrakis(4'-glycidyloxyphenyl)pentane and the homologous epoxy hexane compound; as well as from mixtures of said ethers or mixed ethers of which one or both of the aforesaid ethers is a component.

The monomers of the aforesaid novel pentane and hexane ethers have the following molecular structure:

MOLECULAR STRUCTURE I

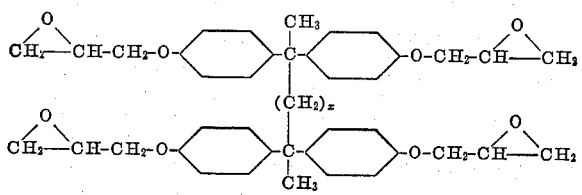

wherein $x$ is 1 or 2.

In actual practice a certain amount of polymeric material, as exemplified by the following idealized structure, may be formed during synthesis:

MOLECULAR STRUCTURE II

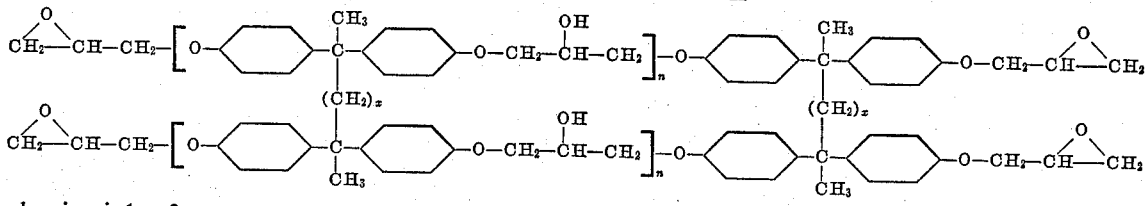

wherein $x$ is 1 or 2.

The degree of polymerization may be controlled by varying the proportions of the reactants and the reaction conditions. When the aforesaid ethers or mixed ethers of which one or both thereof is a component are cured with an acid anhydride, as for example phthalic anhydride, there results a resin which exhibits marked improvement in resistance to heat distortion as contrasted with resins similarly prepared from hitherto known glycidyl ethers, as for example, the resins manufactured by curing glycidyl ethers of bisphenol A [2,2-bis(4'-hydroxyphenyl)propane].

The novel ethers of this invention are characterized by the possession of a combination of unusual properties, to wit, poly-functionality and high reactivity coupled with relatively low viscosity or relatively low softening points. The possession of such characteristics makes the novel ethers of this invention especially suitable for use in potting compounds, laminates, adhesives and coatings. Additionally, the novel ethers are noteworthy because of the fact that they can be produced from materials that are reasonably accessible and at a cost that is economically advantageous.

Accordingly, it is among the principal objects of this invention to provide novel epoxy resins characterized by marked increase in resistance to heat distortion.

Another object of this invention is to provide novel epoxy compounds for use as starting materials in the manufacture of cured resins that are featured by marked increase in resistance to heat distortion, said epoxy compounds being characterized by low viscosity or relatively low softening points, and possessing high functionality from which cross-linking can proceed.

A further object of this invention is to provide novel epoxy compounds which can be cured with cross-linking agents, generally employed in curing heretofore known epoxy compounds such as acid anhydrides and amines, to produce a cured product having markedly improved properties.

A further object of this invention is to provide novel epoxy compounds having the molecular structures designated by the specific structure I and the idealized structure II, supra.

Another object of this invention is to provide novel mixtures of epoxy compounds comprising at least one of the epoxy compounds having the molecular structure designated as I and II and epoxy derivatives of polyhydric phenols and/or polyhydric aliphatic alcohols and/or other polyepoxy compounds.

Further objects and additional advantages of this invention will become apparent from the detailed description thereof as set forth in the following examples illustrating some embodiments thereof:

Example 1.—2,2,4,4-tetrakis(4'-hydroxyphenyl)pentane 564 grams (6 moles) of phenol and 18.4 grams of thioglycolic acid [0.2 mol per mol of the subsequently used ketone] in 10 ml. of 37 percent hydrochloric acid were placed in a 1-liter, 3-necked flask equipped with a condenser, mercury seal stirrer, thermometer, dropping funnel and a tube extending to the bottom of the flask.

The flask contents were heated to 55° C. and saturated with hydrogen chloride [generated by dropping concentrated sulfuric acid onto dry sodium chloride], the hydrogen chloride being introduced into the flask through the tube. Then 100 grams (1 mol) of 2,4,-pentanedione (acetylacetone) were added dropwise through the dropping funnel with continuous stirring during one hour at 59°–61° C. The reaction was slightly exothermic. During the addition of the ketone, a continuous rapid stream of hydrogen chloride was passed through the solution. This was continued for an additional 20 minutes at 60°

C. and also while the flask was cooled by an ice bath to 30° C. The flask was then sealed and allowed to stand at 30° C. After four days the contents had become a nearly solid mass of reddish crystals. The product was purified by washing four times with cold water, three times with 5 percent sodium carbonate solution and six times with hot water. After drying at 85° C. it was a light pink crystalline solid, suitable for use without further purification. The yield was 309 grams, 70 percent of theoretical. After two recrystallizations from ethyl acetate and toluene, the product was a pink crystalline solid which melted at 248°–249° C. uncorrected.

*Example 2.—2,2,4,4-tetrakis(4'-glycidyloxyphenyl) pentane*

220 grams (0.5 mol) of 2,2,4,4-tetrakis(4'-hydroxyphenyl)pentane, the product of Example 1, and 740 grams (8 moles) of epichlorohydrin were mixed and heated to 55° C. in a 3-necked, round-bottomed flask equipped with a reflux condenser, thermometer, dropping funnel, and a high-speed stirrer. Then, 168 grams (3 moles) of potassium hydroxide, as a 30 percent. aqueous solution, were added dropwise with constant stirring during 70 minutes. While the alkali was being added, and for an additional 30 minutes, the temperature was maintained at 68°–73° C. by the occasional use of an ice bath and, near the end of the reaction, an oil bath. The reaction mixture was then washed with water until free of alkali. Volatile materials were removed from the product by vacuum distillation (from 40 mm. to 2 mm., mercury gauge).

The ether was obtained as a light brown, moderately viscous liquid having an average of 0.52 epoxide group per hundred grams. The yield was 260 grams, 78 percent of theoretical. The foregoing comments on the fact that the product is probably the slightly polymerized ether apply here.

*Example 3.—Cured resin made from Example 2*

60 parts of the product of Example 2 and 40 parts of phthalic anhydride were mixed and cured at a temperature of 120° C. for a period of 20 hours.

A bar of this cured resin was then subjected to a stress of 1,500 pounds per square inch. The bar failed to show heat distortion until the temperature thereof had reached 140° C. That resistance to heat distortion was sharply in contrast with the heat-distortion characteristics of resins similarly prepared from commercially known glycidyl ethers. For example, a resin prepared from Epon 834, reported to be a glycidyl ether of Bisphenol A, by the method described in this example, exhibits heat distortion at a temperature as low as 113° C.

TEST METHOD

Heat distortion figures were determined by the following method. A sample bar of the cured resin, 2.25" x 0.5" x 0.25", is supported in a mineral oil bath by cylindrical rods 5/32" in diameter spaced 2 inches apart on centers. A stress of 1,500 pounds per square inch is applied across the entire width of the sample, at its center, by a cylindrical bearing 5/32" in diameter. The temperature of the oil bath is raised exactly one degree per minute while total deflection of the sample is measured at half-minute intervals by a micrometer. The rate of deflection during each interval is calculated in 0.001" per minute and plotted against the average temperature of that interval. This gives a curve which is nearly horizontal before, and nearly vertical at, the softening point. The temperature shown by the point at which tangents to these two portions of the curve intersect is considered to be the temperature at which heat distortion occurs. A series of compositions of varying ratios of glycidyl ether to anhydride was run for each system described and compositions given are the ones that give maximum resistance to heat distortion, as determined by graphing the individual determinations for each system.

The ratio of 60 parts of the ether of Example 2 to the 40 parts of phthalic anhydride results in the novel cured resin of this example having the optimum mechanical properties. The ratio of the phthalic anhydride may vary, however, between 25 and 50 percent in the combined mass of the cured resin.

Among the other carboxylic acid anhydrides which may be employed as cross-linking agents in curing the epoxy compounds of Example 2 to produce the resin of Example 3, there are: maleic anhydride, succinic anhydride, adipic polyanhydride (a condensation polymer of adipic acid), tetrahydrophthalic anhydride, dichlorophthalic anhydride, tetrachlorophthalic anhydride, and any of the carboxylic acid anhydrides which act as cross-linking agents in the curing of epoxy resins.

Among the amines possessing cross-linking action in the curing of epoxy resins, there are: diethylene triamine, diethylamine, piperidine, N-methyl morpholine, and pyridine.

The aforesaid carboxylic acid anhydrides or the amines may be used in the curing operation to produce the product of Example 3 either as the individual anhydrides or mixed anhydrides, or the individual amines or the mixed amines.

The time of curing of the resin of this example by means of the cross-linking agents above mentioned will vary, especially in the case of the acid anhydrides, upon the temperature of curing. Thus, when the phthalic anhydride is used as the curing agent, the curing may be achieved in one hour when the temperature is 200° C. When the amine cross-linking agents are employed the time of curing is short, the curing taking place spontaneously at room temperature.

*Example 4*

A glycidyl ether of 2,2,4,4-tetrakis(4'-hydroxyphenyl)pentane was prepared as described in Example 2 except that 370 grams (4 mols) of epichlorohydrin was used, i. e., twice rather than four times the stoichiometric amount. The product was a liquid which is slightly more viscous than that obtained in Example 2 because of a slight increase in the degree of polymerization. It had an average of 0.48 epoxide group per hundred grams. The yield was 472 grams, 71 percent of theoretical.

*Example 5.—Cured resin made from Example 4*

A bar of cured resin was prepared in accordance with the method of Example 3 from the product of Example 4. When tested in accordance with the test method above described, the bar failed to show heat distortion until the temperature thereof had reached 139° C.

*Example 6.—2,2,5,5-tetrakis(4'-hydroxyphenyl)hexane*

This product was manufactured by the above described method (Example 1) for the manufacture of pentane analogue, except that 114 grams (1 mol) of 2,5-hexanedione (acetonylacetone) were used in the place of the corresponding pentanedione.

The crude product was purified as follows: after the reactants had formed a nearly solid mass of crystals, all adhering liquid was removed by suction filtration through glass wool. The crystals were then washed three times with cold 95 percent ethanol and dried in an oven at 85° C. The product was a white, crystalline solid which melted with partial decomposition at 292°–295° C. (uncorrected). The yield was 189 grams, 42 percent of theoretical.

*Example 7.—2,2,5,5-tetrakis(4'-glycidyloxyphenyl) hexane*

The above ether was prepared in the manner described in Example 2 for the preparation of the pentane analogue. There was used as the starting material, 2,2,5,5-tetrakis (4'-hydroxyphenyl)hexane, the product of Example 6, in the amount of 227 grams (0.5 mol).

This ether was obtained as a light brown amorphous solid which softened at 30°–48° C. It had an average of 0.51 epoxide group per hundred grams. The yield was 228 grams, 67 percent of theoretical.

*Example 8.—Cured resin made from Example 7*

A cured resin was manufactured from the product of Example 7, in accordance with the procedure described in Example 3.

A bar of the resin so made, and tested in accordance with the test method above described, failed to show heat distortion until the temperature had reached 149° C.

*Example 9*

A second ether of 2,2,5,5-tetrakis(4'-hydroxyphenyl)-hexane was prepared in accordance with the general procedure described above, except that 555 grams (6 mols) of epichlorohydrin was used [3 rather than 4 times the stoichiometric amount], and 80 grams (2 mols) of sodium hydroxide [the stoichiometric amount of sodium hydroxide rather than 1.5 times the stoichiometric amount of potassium hydroxide] were used.

The product thus obtained was a pale yellow amorphous solid which softened at 70°–90° C. It had an average of 0.29 epoxide group per 100 grams. The yield was 275 grams, 80 percent of theoretical.

*Example 10.—Cured resin made from Example 9*

A cured resin was manufactured from 70 parts of the product of Example 9 and 30 parts of phthalic anhydride, in accordance with the procedure described in Example 3.

A bar of the resin so made, and tested in accordance with the test method above described, failed to show heat distortion until the temperature thereof had reached 137° C.

*Example 11.—A mixed glycidyl ether*

91.3 grams (0.4 mol) of 2,2-bis(4'-hydroxyphenyl)-propane [Bisphenol A] and 176 grams (0.4 mol) of 2,2,4,4-tetrakis(4'-hydroxyphenyl)pentane, the product of Example 1, were used as the starting material and reacted with 888 grams (9.6 mols) of epichlorohydrin, as described in Example 2, in the presence of 179.5 grams of potassium hydroxide. There was obtained by this reaction a mixed polyglycidyl ether. This product was a somewhat less viscous liquid than the product obtained in Example 2 and had an average of 0.49 epoxide group per hundred grams. The yield was 325 grams, 81 percent of theoretical.

*Example 12.—Cured resin made from Example 11*

A bar of cured resin was prepared in accordance with the method of Example 3 from the product of Example 11. When tested in accordance with the test method above described, the bar failed to show heat distortion until the temperature thereof had reached 132° C.

MIXED ETHERS

There may be used in the preparation of the resins of this invention, as indicated above, mixed ethers. Such mixed ethers comprise:

(1) The above described 2,2,4,4-tetrakis(4'-glycidyloxyphenyl)pentane and/or the 2,2,5,5-tetrakis(4'-glycidyloxyphenyl)hexane, and (2) Glycidyl ethers and/or polyepoxy compounds.

Among the glycidyl ethers in foregoing group 2 are compounds derived by the interaction of epichlorohydrin with polyhydric aromatic compounds or polyhydric aliphatic alcohols such as:

POLYHYDRIC AROMATIC COMPOUNDS

Bisphenol A
Catechol
Resorcinol
Hydroquinone
Phloroglucinol
1,5-dihydroxynaphthalene
4,4'-dihydroxybiphenyl
4,4'-dihydroxydiphenyl sulfone
4,4'-dihydroxydiphenyl methane
Tris(4-hydroxyphenyl)methane
2,2,3,3-tetrakis(4'-hydroxyphenyl)butane
1,4,9,10-tetrahydroxyanthracene
1,2,4-trihydroxyanthraquinone

POLYHYDRIC ALIPHATIC ALCOHOLS

Ethylene glycol
Polyethylene glycol
Glycerol
Pentaerythritol
Sorbitol

Among the above referred to polyepoxy compounds are:

Vinyl cyclohexene diepoxide
Butylenediepoxide
The diepoxide of diethylene glycol bis-exodihydrodicyclopentadienyl ether The foregoing mixtures may be made by mixing the components of the mixture. Alternatively, in the case of mixtures consisting of (a) the above mentioned 2,2,4,4 - tetrakis(4' - glycidyloxyphenyl)pentane and/or 2,2,5,5 - tetrakis(4' - glycidyloxyphenyl)hexane, and (b) one or more of the glycidyl ethers of the polyhydric aromatic compounds, above mentioned, by reacting epichlorohydrin in the usual manner with a mixture of the parent tetrakis(4'-hydroxyphenyl)pentane and/or hexane, above described, and the parent polyhydric aromatic compounds whose ethers are desired.

*Example 13*

90 parts of the product of Example 2 and 10 parts of diethylene triamine were mixed at room temperature and cured during 18 hours at room temperature followed by 5 hours at 120° C.

A bar of this cured resin was then subjected to a stress of 1,500 pounds per square inch. It showed markedly greater resistance to heat distortion than that shown by resins made from typical difunctional glycidyl ethers; no exact comparison can be made because of qualitative differences in behavior.

We have found that approximately 10 percent of the amine is the optimum amount to be used in effectuating the cure of the above described resinous epoxy compounds. We have, however, obtained good resins between the limits of 5 percent and 15 percent of diethylene triamine. Those limits may, however, be extended to range from 3 percent to 17 percent.

That range may vary for different amines, but the suitable range for a specific amine may readily be ascertained by a laboratory determination.

The novel epoxy compounds of this invention are especially valuable in casting. The novel ethers possess a relatively low viscosity or a relatively low softening point which makes it possible readily to manipulate them at low temperatures so that a mixture of an ether (or mixed ethers) and a cross-linking agent or agents can be easily made to fill the interstices of electrical and electronic equipment in order to support and protect fragile parts. Likewise, such mixtures may also be used for potting and encapsulating.

As has been set forth above, the increase in resistance to heat distortion of epoxy resins is achieved by using the novel tetrakis pentane and/or hexane compounds of this invention, as for example, the products of Examples 2, 4, 7, 9 and 11. In instances where the maximum increase in resistance to heat distortion thereby attainable is not required, there may be used the above described tetrakis compounds in admixtures with the other named glycidyl ethers and/or other epoxy compounds. However, to obtain a sensible increase in resistance of the resin to heat distortion, even though it is below the maximum attainable, the tetrakis pentane and/or hexane compounds should constitute at least 10 percent of the admixture.

It will be understood that the foregoing description of the invention herein, and the examples set forth, are merely illustrative of the principles thereof. Accordingly, the appended claims are to be construed as defining the invention within the full spirit and scope thereof.

We claim:

1. As novel products, the resins resulting from the curing of (1) epoxy compounds comprising a member of the group consisting of 2,2,4,4-tetrakis(4'-glycidyloxyphenyl)pentane and 2,2,5,5-tetrakis(4'-glycidyloxyphenyl)hexane and (2) a cross-linking agent of the class consisting of carboxylic acid anhydrides and amines.

2. Resins in accordance with claim 1 wherein the epoxy compounds are mixtures of the named epoxy compounds and glycidyl ethers of at least one of the group consisting of (a) other polyhydric phenols, (b) polyhydric aliphatic alcohols.

3. A novel resin comprising 2,2,4,4-tetrakis(4'-glycidyloxyphenyl)pentane when cured by a cross linking carboxylic acid anhydride.

4. A novel resin comprising 2,2,4,4-tetrakis(4'-glycidyloxyphenyl)pentane when cured by cross linking amine.

5. A novel resin comprising from 50 to 75 parts of 2,2,4,4-tetrakis(4'-glycidyloxyphenyl)pentane when cured with from 25 to 50 parts of phthalic anhydride.

6. A novel resin comprising 60 parts of 2,2,4,4-tetrakis-(4'-glycidyloxyphenyl)pentane when cured by 40 parts of phthalic anhydride.

7. A novel resin comprising 2,2,5,5-tetrakis(4'-glycidyloxyphenyl)hexane when cured by a carboxylic acid anhydride.

8. A novel resin comprising 2,2,5,5-tetrakis(4'-glycidyloxyphenyl)hexane when cured by an amine.

9. A novel resin comprising a mixed glycidyl ether of 2,2-bis(4'-hydroxyphenyl)propane and 2,2,4,4-tetrakis(4'-hydroxyphenyl)pentane when cured by a carboxylic acid anhydride.

10. A novel resin comprising a mixed glycidyl ether of 2,2-bis(4'-hydroxyphenyl)propane and 2,2,4,4-tetrakis(4'-hydroxyphenyl)pentane when cured by an amine.

11. Novel epoxy compounds having the molecular structures

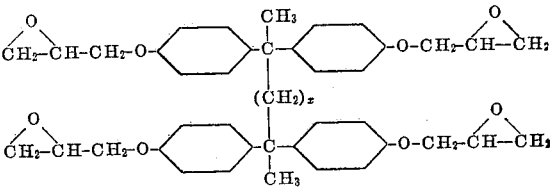

wherein $x$ is a member of the series 1, 2.

12. A novel epoxy compound in accordance with claim 11 wherein $x$ is 1.

13. A novel epoxy compound in accordance with claim 11 wherein $x$ is 2.

No references cited.